US007219076B1

(12) United States Patent  (10) Patent No.: US 7,219,076 B1
Racine  (45) Date of Patent: May 15, 2007

(54) SYSTEM AND METHOD UTILIZING A USER INTERFACE HAVING GRAPHICAL INDICATORS WITH AUTOMATICALLY ADJUSTED SET POINTS

(75) Inventor: Sandra J. Racine, Muskego, WI (US)

(73) Assignee: Unisys Corporation, Blue Bell, MN (US)

( * ) Notice: Subject to any disclaimer, the term of this patent is extended or adjusted under 35 U.S.C. 154(b) by 525 days.

(21) Appl. No.: 10/676,187

(22) Filed: Sep. 30, 2003

(51) Int. Cl.
G06Q 30/00 (2006.01)
G06Q 10/00 (2006.01)
G06F 17/30 (2006.01)

(52) U.S. Cl. .................... 705/26; 705/5; 705/6; 705/27
(58) Field of Classification Search .............. 705/5–6, 705/26–27; 715/700
See application file for complete search history.

(56) References Cited

U.S. PATENT DOCUMENTS 5,819,043 A * 10/1998 Baugher et al. ............ 709/222
5,956,691 A * 9/1999 Powers ......................... 705/4
6,012,044 A * 1/2000 Maggioncalda et al. .. 705/36 R
2002/0046134 A1 * 4/2002 Egashira et al. ............. 705/26
2002/0184107 A1 * 12/2002 Tsuda et al. ................. 705/26
2004/0158497 A1 * 8/2004 Brand ......................... 705/26

FOREIGN PATENT DOCUMENTS

GB 2336403 A * 3/2002

OTHER PUBLICATIONS

"The Easy Way to Figure out those Vital Financial Statistics". Temple, Peter. Financial Times. Jan. 29, 2000. [recovered from Proquest database Feb. 21, 2007].*
"Karl's Mortgage Calculator". www.jeacle.ie/mortgage. Feb. 4, 2002 [recovered from www.Archive.org Feb. 21, 2007].*

* cited by examiner

Primary Examiner—Matthew S. Gart
Assistant Examiner—William J. Allen
(74) Attorney, Agent, or Firm—Charles A. Johnson; Richard J. Gregson; Shumaker & sieffert, P.A.

(57) ABSTRACT

A system includes a user interface software module that presents a user interface having a plurality of graphical indicators that represents respective ranges of available options associated with a set of items available from an electronic commerce system. The user interface software module selects one of the items based on an adjustment to one of the graphical indicators by a user, and automatically adjusts at least one of the other graphical indicators based on the selected one of the items.

25 Claims, 5 Drawing Sheets

30

○ ROUND TRIP  ○ ONE-WAY  ← 38K

DEPARTURE
AIRPORT [MSP] — 38A      ALTERNATE AIRPORT [ ] — 38F
CITY [ST. PAUL]          ALTERNATE CITY [MILWAUK]
  38B                      38G

DESTINATION
AIRPORT [LGA] — 38C      ALTERNATE AIRPORT [JFK] — 38H
CITY [NY]                ALTERNATE CITY [ ]
  38D                      38I
DEPART [05MAY03]         RETURN [13MAY03]
  38E                      38J

DEPARTURE TIME → AM 7 —————— PM 10
  40A          41A

RETURN TIME → AM 6 —————— PM 6
  40B          41B

FLYING TIME → 1.5 —————— 5
  40C          41C

TRAVEL TIME → 3.5 —————— 29
  40D          41D

TRANSFERS → 0  1  2  3
  40E       41E

PRICE → 175 —————— 300
  40F       41F

EXACT COST [$200] — 46
PAYMENT METHOD [ ] — 48
36 {
  (BUY) — 50

SYSTEM AND METHOD UTILIZING A USER INTERFACE HAVING GRAPHICAL INDICATORS WITH AUTOMATICALLY ADJUSTED SET POINTS

TECHNICAL FIELD

The invention generally relates to electronic commerce systems and, in particular, user interfaces for electronic commerce systems.

BACKGROUND

In a conventional electronic commerce ("e-commerce") system, a user inputs specific search criteria to identify a desired product or service. In response, the e-commerce system returns descriptions of the various products and services that are available through the system and that match the specified criteria. In other words, the e-commerce system allows the user to input only certain criteria or will search and sort only on specific criteria. For example, the user may input a destination city, a departure city and specific dates into a user interface provided by an airline flight reservation system. In return, the airline flight reservation system provides a list of all available flights that match the specified criteria. However, other criteria or options of the product or service may affect the user's selection, and may not be available to the user based on the limited number of search variables. As a result, the user may not be able to make a well-informed decision taking into account all of the available options.

In addition, in many situations the number of matching products or services may be extremely large, or have a large number of criteria/options that do not correspond with the criteria the e-commerce system allows the user to input forcing the user to browse through numerous product or service descriptions in hopes of finding the product or service that most closely suites his or her needs and desires. To reduce the returned list of products or services to a manageable number, or to try and locate one that has all the criteria as wished for, the user submits modified search criteria to retrieve a new set of matching products or services, a process made more arduous if the criteria or option that the user is looking for is not an input field. Often, this process is repeated until the desired product or service is found. This may result in numerous search iterations and frustration on behalf of the user.

SUMMARY

In general, the invention is directed to an electronic commerce ("e-commerce") system that allows the user to visually balance options when purchasing a desired "item," i.e., a product or service offered by the e-commerce system. In particular, the e-commerce system presents a user interface that provides a graphical representation of option identification and their available ranges for a set of available items, and allows the user to visually balance the options without requiring that the user view potentially voluminous sets of available items. This process allows the user to perform a form of real-time tradeoff analysis to combine the available options and select one of the items that most closely matches the needs and desires of the user.

Initially, the user inputs search criteria into the user interface provided by the e-commerce system to define a baseline set of items, e.g., services, products, or a combination of services and products. For example, the user may interact with the electronic commerce system to purchase airline tickets, and the user may provide search criteria that specify a departure city, a destination city, and a range of dates.

In response, the e-commerce system does not necessarily display a matching set of items, but rather displays graphical indicators that represent ranges of available options associated with the set of items matching the search criteria. For each graphical indicator, the system displays a set point representing a current value or position within the respective option range. Using the purchase of airline tickets as an example, each of the graphical indicators may represent one option associated with the set of available flights, such as price of the ticket, number of transfers, total flying time, time of departure, an arrival time, and the like. Specifically, one of the graphical indicators may provide a graphical representation of the number of transfers within the available set of flights. In this case, the graphical indicator visually illustrates to the user that the available set of flights matching his or her search criteria resulted in flights in which the maximum and minimum number of transfers is bounded by the graphically illustrated range.

The user interacts with the user interface of the e-commerce system to adjust the set points of the graphical indicators, thereby increasing or decreasing the requirements for the available options within the defined ranges. Using the airline ticket example again, the user may want his or her flight to have the fewest number of transfers and, therefore, adjusts the position of the set point of the graphical indicator associated with the number of transfers to reflect this desire.

In response, the e-commerce system automatically re-computes positions for one or more of the set points associated with the other options in response the adjustments made by the user. In this manner, the user is able to perform a form of real-time tradeoff analysis by adjusting one or more of the set points, and then observing the effects of his or her action on the other set points. This allows the user to weigh and balance the different options to select the item of the set that most suites his or her needs and desires without necessarily requiring that he or she browse through voluminous descriptions of the available items.

In one embodiment, a method comprises presenting a user interface that includes a plurality of graphical indicators that represent ranges of options associated with a set of items available from an electronic commerce system, and receiving input from a user that adjusts one of the graphical indicators within the respective range. The method further comprises selecting one of the items from the set based on the graphical indicator adjusted by the user; and automatically adjusting at least one of the graphical indicators not adjusted by the user based on the selected one of the items.

In another embodiment, a system comprises a user interface software module operating on a computer. The user interface software module presents a user interface that includes a plurality of graphical indicators that represents respective ranges of available options associated with a set of items available from an electronic commerce system. The user interface software module selects one of the items based on an adjustment to one of the graphical indicators by a user, and automatically adjusts at least one of the other graphical indicators based on the selected one of the items.

In another embodiment, an electronic commerce system comprises a host computer that executes software to transact reservations for airline flights, wherein the airline flights have a set of available options. The system further comprises a user interface software module executing on a client computer coupled to the host computer via a network. The user interface software module presents a user interface having a plurality of graphical indicators and user-adjustable set points that graphically define positions within ranges of the available options associated with the airline flights.

In another embodiment, a system comprises a computing means for providing real-time tradeoff analysis of options associated with items offered to a user by an electronic commerce system. The system further comprises a network interface means for generating a user interface for the computing means, and display means for presenting the user interface to a user. The network interface means includes generation means for generating the user interface to include a plurality of graphical indicators, each of the graphical indicators representing a respective range of available options associated with the items and having a set point specifying a value within the range. The computing means includes automatic update means to automatically re-compute one or more of the set points and adjust the graphical indicators associated with the re-computed set points in response to input from the user.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 2 illustrates an exemplary user interface of the electronic commerce system with which the user interacts to select and purchase items.

FIGS. 4–5 illustrate exemplary user interfaces presented by the electronic commerce system in response to interaction with the user.

DETAILED DESCRIPTION

Figure 1:
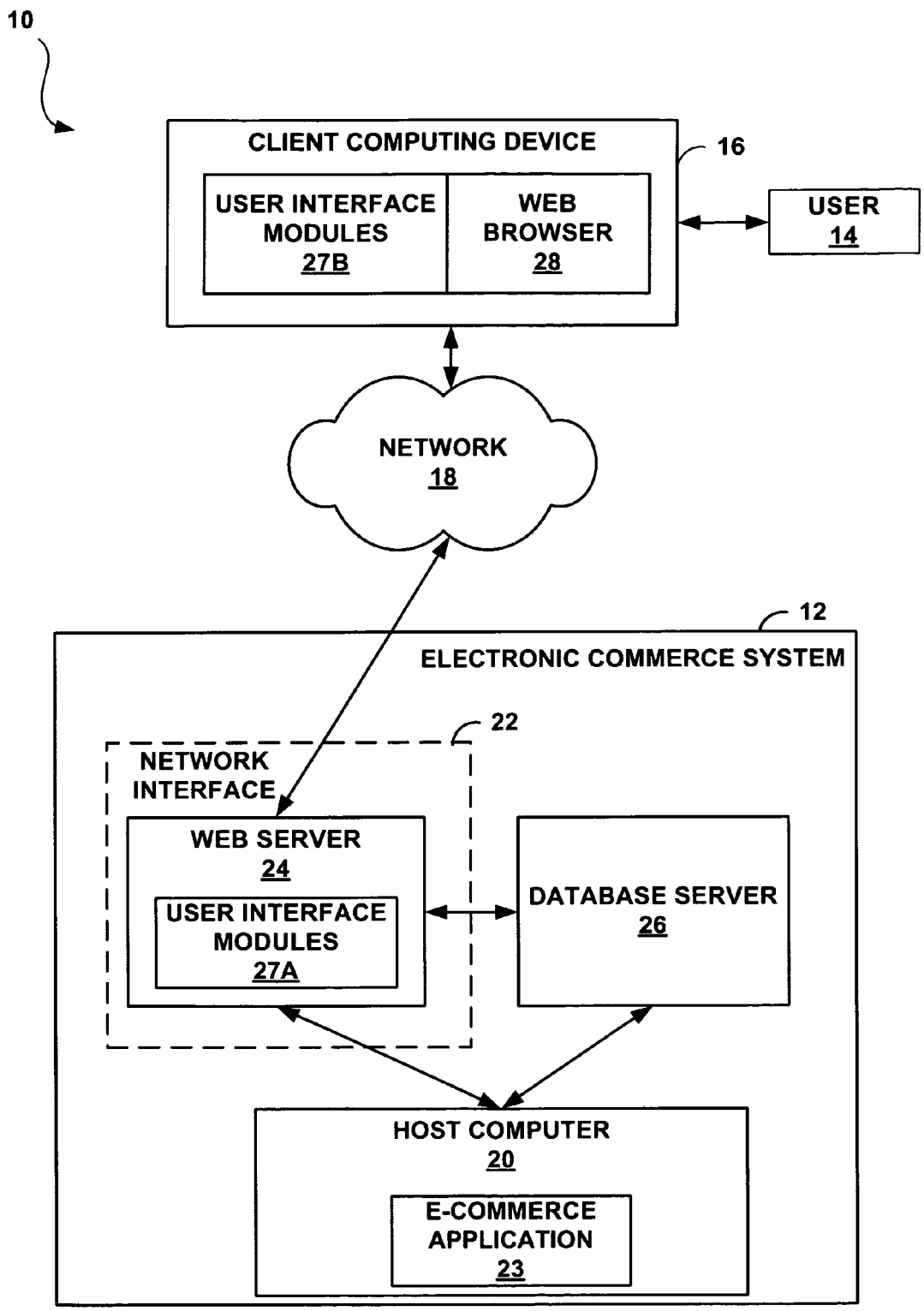
FIG. 1 is a block diagram illustrating an exemplary electronic commerce system that presents a user interface in accordance with the invention.

FIG. 1 is a block diagram illustrating an exemplary network-based environment 10 having an electronic commerce (e-commerce) system 12 with which a user 14 interacts to select and purchase an item, i.e., a product, service, or combination thereof. In particular, e-commerce system 12 presents a user interface that provides graphical representations of ranges of available options for a set of items. User 14 interacts with the user interface via client computing device 16 and network 18 to select and optionally initiate a purchase transaction for one or more of the items.

E-commerce system 12 presents the user interface to include a plurality of graphical indicators that each represent a range of options associated with the set of items offered to user 14 by e-commerce system 12. For each graphical indicator, e-commerce system 12 displays a set point representing a position, e.g., a value, within the respective range of options. Using the purchase of airline tickets as an example, each of the graphical indicators may represent an option associated with the set of available flights, such as a price of the ticket, number of transfers, total flying time, time of departure, time of arrival, and the like. In this example, one of the graphical indicators may graphically represent the number of transfers and have a corresponding range of one to three transfers. This bounded range associated with the graphical indicator provides a visual representation to user 14 that the set of available flights have a minimum of one transfer and a maximum of three transfers. In this manner, user 14 may appreciate the range of available options without necessarily browsing individual product or service descriptions.

As will be described in detail, user 14 interacts with the user interface to adjust the set points of the graphical indicators, thereby increasing or decreasing his or her requirements for the options. Using the airline ticket example again, user 14 may desire his or her flight to have the fewest number of transfers and, therefore, adjust the set point of the corresponding graphical indicator to reflect this desire.

In response, e-commerce system 12 automatically re-computes and adjusts one or more of the other set points of the graphical indicators associated with the other options, thereby providing visual feedback to user 14 as to the effects of his or her adjustment. In this manner, user 14 is able to perform a form of real-time tradeoff analysis by weighing and balancing the different options to select the item of the set that most suites the needs and desires of user 14. Returning to the airline example, assuming user 14 adjusts one of the set points to restrict the set of available flights to flights having only a single transfer, e-commerce system 12 automatically compute the other set point. For example, total flying time for single-transfer flights may be lower but the price may be higher, causing e-commerce system 12 to automatically compute and adjust the set points associated with total flying time and price to reflect this impact.

User 14 may continue to adjust set points associated with different options until user 14 finds the item that most suits his or her needs and desires. After user 14 selects an item of interest from the set of items, user 14 initiates the purchase of the selected item. In the exemplary embodiment illustrated in FIG. 1, e-commerce system 12 includes a host computer 20, web server 24 and database server 26. Although host computer 20, web server 24, and database server 26 are illustrated separately in FIG. 1 for exemplary purposes, e-commerce system 12 may be realized by a single computing device or a plurality of cooperating computing devices. Moreover, these devices may be centrally located or physically distributed.

In general, host computer 20 provides a computing platform for hosting an e-commerce application 23. Host computer 20 may comprise, for example, a Unisys 2200 series mainframe executing airline reservation software. Web server 24 provides a network-based interface by which remote user 14 accesses host computer 20 and/or database server 26.

User 14 typically accesses e-commerce system 12 via network 18 using client computing device executing a suitable communication software, e.g., a web browser 28. Network 18 may be any public network, such as the Internet, a private network, or combinations thereof. User 14 may access e-commerce system 12 using a network-enabled computing device, such as a workstation, personal computer, laptop computer, or a personal digital assistant (PDA).

Web server 24 executes web server software to provide an environment for interacting with remote user 14. More specifically, user interface modules 27A and 27B (collectively "user interface modules 27") provide an interface with which user 14 interacts to visually balance the options associated with the set of items in order to select an item within the set that most closely matches his or her needs and desires.

Interface modules 27A represent "server-side" user interface modules 27A that execute within an operating environment provided by web server 24. Interface modules 27B represent "client-side" user interface modules 27B that may be downloaded to and executed on client computing device 16. Client-side user interface modules 27B may, for example, include Active X components or Java scripts executed by web browser 28 executing on client computing device 16. In general, user interface modules 27 may include Active Server Pages, web pages written in hypertext markup language (HTML) or dynamic HTML, Active X modules, Java scripts, Java Applets, Distributed Component Object Modules (DCOM), and the like. Although illustrated for purposes of example, the techniques described herein may be implemented using server-side user interface modules 27A, client-side user interface modules 27B, or combinations thereof.

User interface modules 27 interact with host computer 20, database server 26, or both, to retrieve information describing a set of items based on initial criteria provided by user 14. Specifically, user interface modules 27 interact with database server 26 to identify the items that match the search criteria. As described, user interface modules 27 displays graphical indicators that represent ranges of available options associated with the identified set of items offered to user 14 by e-commerce system 12. Database server 26 may provide an operating environment for a database management system (DBMS) for storing the product or service information. The database management systems may be, for example, a relational (RDBMS), hierarchical (HDBMS), multidimensional (MDBMS), object oriented (ODBMS or OODBMS) or object relational (ORDBMS) database management system. Upon receiving a query for product or service information, the database management system executing on database server 26 determines a matching set of items and returns related product or service information.

Although for purposes of illustrates the techniques are described in reference to a single user 14 interacting with e-commerce system 12, the techniques may be applied to allow a plurality of users. Furthermore, although the example of an airline ticket purchasing system is used herein, e-commerce system 12 may allow user 14 to purchase any of a variety of items. For example, user 14 may use e-commerce system 12 to purchase services such as hotel reservations, car rental or an entire vacation package, i.e., flight, hotel and car rental. In addition, user 14 may use e-commerce system 12 to purchase products such as houses, cars, digital cameras, or any other consumer product.

FIG. 2 illustrates an exemplary user interface 30 presented by user interface modules 27 for interacting with e-commerce system 12. In particular, user interface 30 allows user 14 to visually balance options within associated ranges to select an item that most closely matches the needs and desires of the user.

User interface 30 includes a search criteria input region 32, an option tradeoff region 34, and an action region 36. Search criteria input region 32 includes input areas that allow user 14 to provide information describing one or more "items," e.g., a product or a service. In the example of FIG. 2, search criteria input region 32 of user interface 30 includes input areas 38A–38J for specifying criteria for selecting an airline flight. More specifically, input areas 38A–38J allow user 14 to input departure and destination information, including departure and destination airports, alternate airports, cities, and alternate cities as well as itinerary information such as depart and return dates. In addition, input area 38K allows user 14 to specify a desired type of ticket, i.e., a round trip ticket or a one-way ticket.

In the example of FIG. 2, input areas 38A–38J of user interface 30 include dropdown menus listing possible selections for inputting departure and destination information as well as itinerary information. For example, the dropdown menu of input area 38A may include a list of all major United States airports. Alternatively, input areas 38A–J may be text input areas in which user 14 types a destination or other type of input areas. Search criteria input region 32 may include additional input areas for inputting more precise search information or a reduced number of input areas for less precise searches. For example, search criteria input region 32 may only include input areas for inputting departure and destination city information and date information.

Upon receiving search criteria from user 14, web server 24 accesses database server 26 to retrieve a set of items that match the search criteria. E-commerce system 12 graphically illustrates ranges of available options associated with the set of items to user 14 via option tradeoff region 34. More specifically, option tradeoff region 34 includes graphical indicators 40A–40F (collectively "graphical indicators 40") that represent ranges of available options associated with the set of items that match the criteria supplied by user 14 via search criteria input region 32.

In addition, user interface 30 presents initial set points 41A–41F (collectively "set points 41") within each of the ranges associated with the options. In the example of FIG. 2, set points 41A–41F are slidable within graphical indicators 40 that visually represent the ranges of available options, e.g., characteristics associated with the set of items, and may be adjusted within the respective ranges.

Particularly, each of graphical indicators 40 corresponds to an available option that describes a characteristic of the set of items, and visually depicts a range for that option computed based on the set of items returned from the search query to database server 26. For example, graphical indicator 40A corresponds to departure times of the set of flights matching the search criteria, and illustrates a range of available departure times from the selected airports and/or cities on the selected dates. Specifically, graphical indicator 40A illustrates that the departure times within the set of flights vary from 7 AM to 10 PM.

Similarly, graphical indicator 40B represents a range of return flight times, graphical indicator 40C represents a range of the total amount of flying time, graphical indicator 40D represents a range of the total amount of travel time (including layover times at transfer points), graphical indicator 40E represents a range of the number of transfers, and graphical indicator 40F represents a range of the price. For example, graphical indicator 40C visually represents the range of the total amount of flying time for the flights to the selected airports and/or cities on the selected dates varies from 1.5 hours of flying time to 5 hours of flying time. In this manner, graphical indicators 40A–40F represent ranges of available options associated with the set of flights that match the criteria specified by search criteria input region 32.

In accordance with the invention, user interface 30 allows user 14 to interact with e-commerce system 12 and, more particularly, with graphical indicators 40 to identify an item from the set of items that has options that most closely match the needs and desires of user 14. Specifically, user 14 may interact with host computer 22 in real-time via option tradeoff region 34 of user interface 30 to adjust set points 41 associated with options important to user 14, thereby weighing and balancing the different options to find the item of the set that most suites the needs and desires of user 14. For example, e-commerce system 12 may initially display to user 14 set points 41 that correspond to options of a particular flight that has a price that is substantially in the middle of the available price range. In the example illustrated in FIG. 2, e-commerce system 12 may initially compute and adjust set points 41 associated with each of the options to correspond with a flight from the set of flights that has a 8 am departure time, a 6 pm return time, a total flying time of 5 hours, a total travel time of 12 hours, two transfer, and costs around $200. Nevertheless, user 14 may wish to determine the impact of select a departure time in the afternoon and, therefore, adjust the set point 41A of graphical indicator 40A toward the afternoon times within the range.

This user adjustment may impact the other options. For example, the flights of the set that have afternoon departure times, for example, may also have no transfers, a shorter travel and flying time, and are more expensive. E-commerce system 12 automatically re-computes positions for set points 41 associated with the other options, i.e., the set points of the other graphical indicators 40, and adjusts the set points to provide visual feedback to user 14 as to the effect of selecting a departure time in the afternoon. In other words, e-commerce system 12 graphically illustrates the tradeoff relationships among the options in real-time.

User 14 may continue to adjust set points 41 of graphical indicators 40 in this fashion until user 14 finds a flight that most fits his/her needs and desires. If two or more flights have options that match the options corresponding to the adjusted one of set points 41, e-commerce system 12 may select the flight that has options most similar to the set points of for the previously selected flight. In this manner, e-commerce system 12 may attempt to minimize the overall impact on the positions of the set points do to an adjustment by user 14. Alternatively, e-commerce system 12 may prioritize the options associated with the flights, and select the flight that has options that match the higher priority options. E-commerce system 12 may receive input identifying a prioritization scheme from user 14 or may automatically construct a prioritization based on the set points adjusted by user 14. For example, e-commerce system 12 may assign a high priority to minimizing change to set points 41 that have recently been adjusted by user 14. As another example, e-commerce system 12 may try to minimize a price change to the price set point 40F from the previously selected item.

Upon user 14 identifying an item of interest, action region 36 of user interface 30 enables user 14 to perform an action on the selected item of interest. Action region 36 provides input areas that user 14 interacts with to perform an action, such as buy a particular one of the airline tickets at a specified cost 46. The action region may include an input area 48 to input payment information, such as a credit card number, expiration date and type of credit card. User 14 may enter credit card information and click on a "buy" button 50 to purchase a selected airline ticket. In some embodiments, user 14 may place a selected item in a "virtual" shopping cart via one or more buttons.

Although user interface 30 of FIG. 2 illustrates a user interface for purchasing airline tickets for exemplary purposes, the user interface presented to user 14 may be configured for purchasing other products, services or a combination of products and services using a tradeoff analysis of available options. For example, the user interface may be configured for purchase or lease of a car, in which case the search criteria may be the make of the car and the options may be gas mileage, towing capacity, price and the like. Additionally, the user interface may be configured to allow user 14 to search and purchase multiple items substantially simultaneously using tradeoff analysis of available options. For instance, user 14 may search for airline tickets and hotel reservations via a single user interface.

Figure 3:
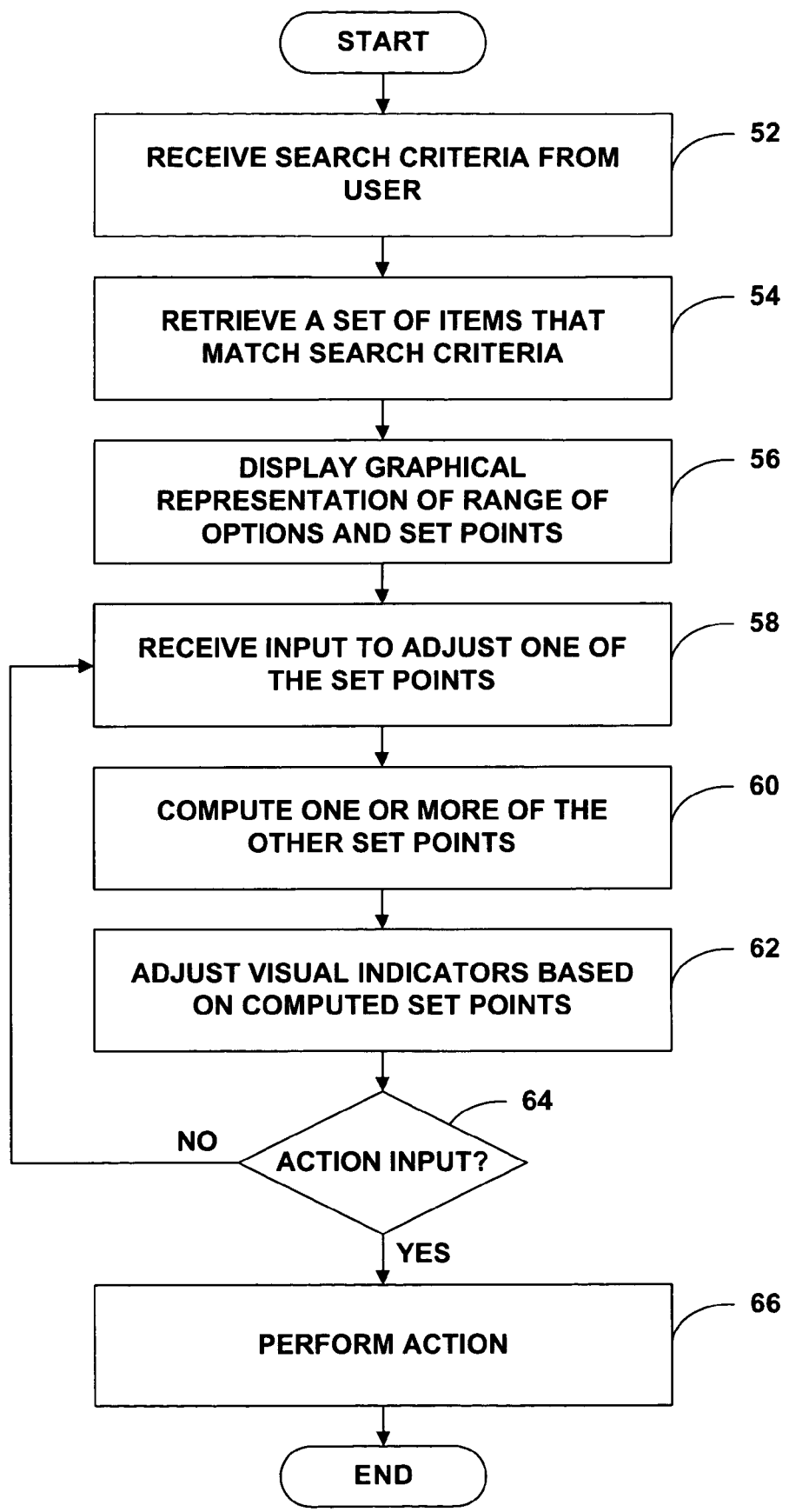
FIG. 3 is a flow diagram illustrating exemplary operation of the electronic commerce system.

FIG. 3 is a flow diagram illustrating exemplary operation of e-commerce system 12. Initially, e-commerce system 12 receives search criteria from user 14 that describes one or more desired items, e.g., products, services or combinations thereof (52). For instance, e-commerce system 12 may receive the search criteria from user 14 via a user interface, such as user interface 30 (FIG. 2). As described above, the items may comprise services such as flight reservations, hotel reservations, car rentals, and the like. Alternatively, the set of items may comprise consumer products such as houses, cars, and the like. For example, a user interface for finding a flight reservation may receive search criteria identifying a departure city, a destination city, a departure date and a return date, which identify potential flights.

Host computer 20 receives the provided search criteria from web server 24, and queries database server 26 to identify a set of items that matches the specified criteria (54). In this manner, user 14 can generally limit the selection processes to items that satisfy a set of baseline requirements, as specified the search criteria.

Web server 26 and, in particular, user interface modules 27 presents a user interface to user 14 that includes a plurality of graphical indicators, e.g., graphical indicators 40 of FIG. 2, that illustrate ranges of available options associated with the set of items. Interface modules 27 generate graphical indicators 40 to place set points 41 at initial positions within the respective option ranges (56). Using the example of purchasing airline tickets, each of graphical indicators 40 may represent a range for an option associated with the set of available flights, such as price of the ticket, number of transfers, total flying time, time of departure, and the like, and the positions of set points 41 may indicate current value or selections within the ranges.

Next, web server 26 receives input from user 14 via the user interface to adjust one of set points 41 of the graphical indicators 40 (58). In response, host computer 20 automatically "rebalances" graphical indicators 40 by re-computing one or more positions of set points 41 associated with the non-adjusted graphical indicators. Web server 26 adjusts set points 41 of graphical indicators 40 based on the positions computed by host computer 20 (60, 62). In this manner, e-commerce system 12 allows user 14 to weigh and balance the different options associated with the set of items, and visually observe the overall effects of adjusting any of the options. Using the flight reservation example, user 14 may want wish to observe the impact of requiring his or her flight to have the fewest number of transfers and, in turn, adjust set point 40E associated with the number of transfers to a low value of the graphically depicted range. In this example, host computer 20 computes and automatically adjusts set points 41 that are associated with the other flight-related options, such as price and flying time, in response to the adjustment to the set point associated with the desired maximum number of transfers.

Throughout the process, web server 26 determines whether an action input is received from user 14 via the user interface, e.g., whether the user has elected to purchase an item based on the current settings reflected by the graphical indicators and their associated set points (64). When e-commerce system 12 has not received action input from user 14, e-commerce system 12 continues to receive input to adjust set points of the graphical indicators, thus allowing the user to further weigh and balancing the different options and view the effects of any adjustments in real-time.

Upon receiving action input from user 14, e-commerce system 12 completes the identified action (66). For example, host computer 20 may initiate an electronic transaction to purchase an item for user 14 based on the current settings reflected by the graphical indicators and their associated set points. In this manner, e-commerce system 12 provides a user interface that allows user 14 to balance and weigh a plurality of options associated with a set of items in order to select an item within the set that most closely matches the needs and desires of user 14.

Figure 4:
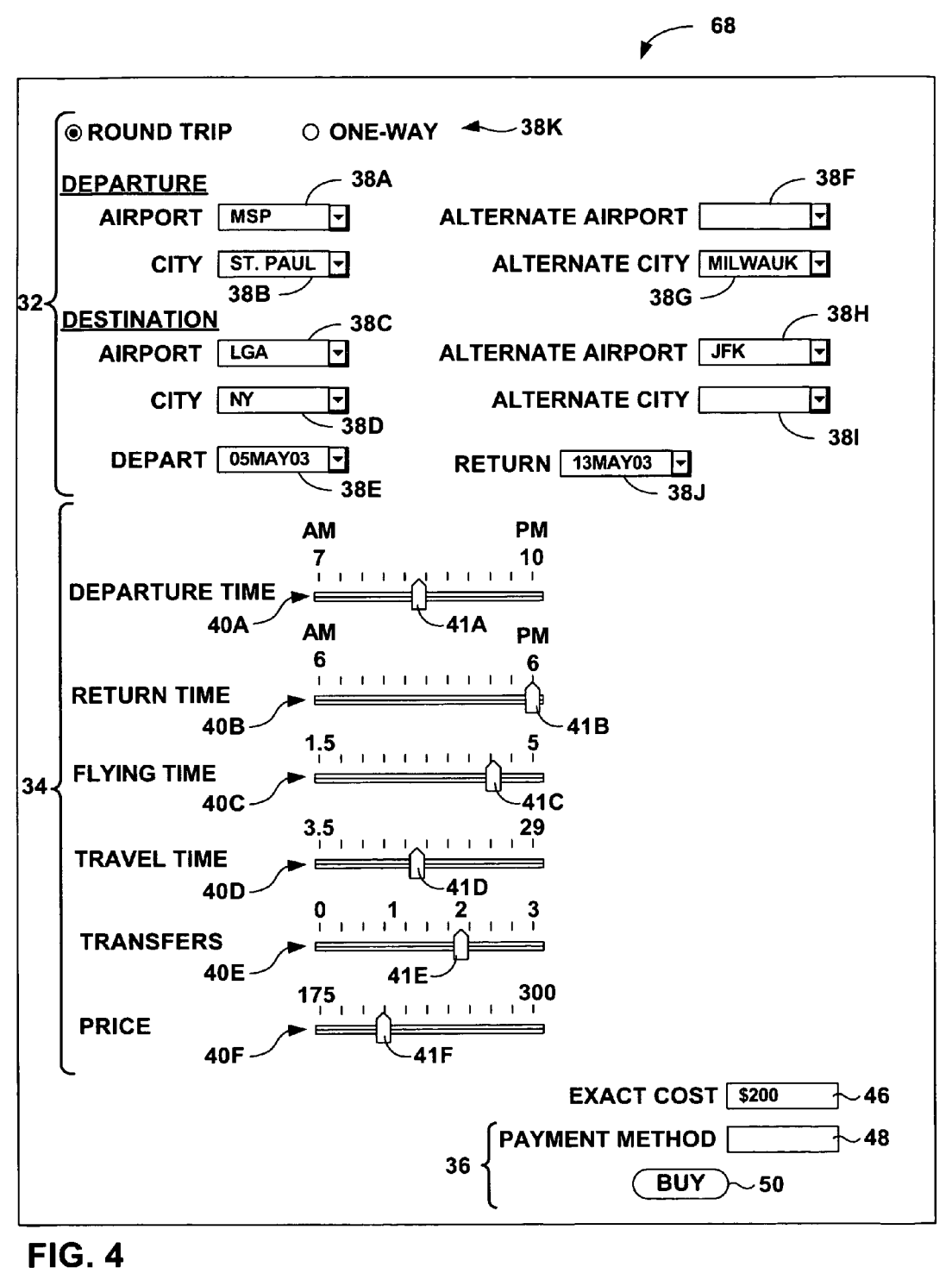
Figure 5:
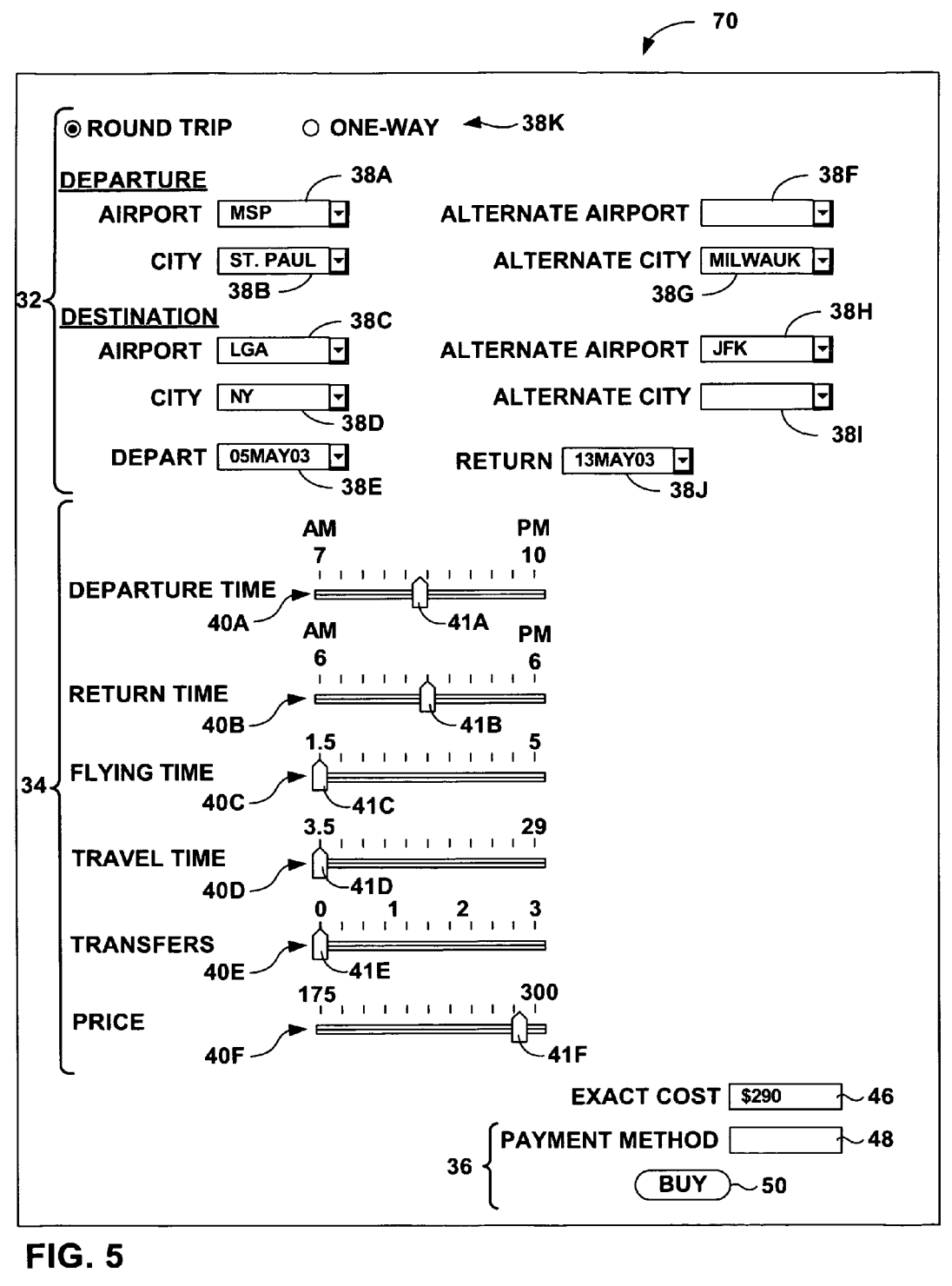

FIGS. 4–5 illustrate exemplary user interfaces presented by the electronic commerce system in response to interaction with the user. In particular, FIG. 4 illustrates a user interface 68 that conforms substantially to user interface 30 of FIG. 2, except that user 14 has adjusted set point 41A associated with the graphical indicator 40A. In this manner, user 14 has adjusted set point 41A to reflect a desired time of departure at approximately 1:00 PM.

FIG. 5 illustrates a user interface 70 presented by e-commerce system 12 after automatically computing positions for any affected set points 41 associated with the other flight-related options. In particular, user interface 70 illustrates user interface 70 conforms substantially to user interface 68 of FIG. 4, except the e-commerce system 12 has adjusted set points 41B–41F associated with the other flight-related options based on the newly computed positions.

For example, to re-compute the positions of set points 41B–41F, e-commerce system 12 may identify a flight within the set that best satisfies the set point for the adjusted option, i.e., set point 41A. Based on the identified flight, e-commerce system 12 computes positions for the set points associated with the other options. Particularly, in the illustrated example, the flight identified by e-commerce system 12 may have a return time of 12:00 PM, no transfers, a total travel time of only 3.5 hours, a flying time of 1.5 hours, and a price of $290, as reflected by the adjusted set points 41B–41F of graphical indicators 40B–40F.

User 14 may interact with enterprise planning system 12 in the fashion described above to perform numerous tradeoff analyses until user 14 identifies a flight that satisfies his or her needs and desires.

Various embodiments of the invention have been described. These and other embodiments are within the scope of the following claims.

The invention claimed is:

1. A method of selecting an item for a user comprising:
presenting a user interface that includes a plurality of graphical input mechanisms adjustable by a user, wherein the graphical input mechanisms represent ranges of options associated with a set of items available from an electronic commerce system, and wherein the graphical input mechanisms include set points having adjustable positions within the represented ranges, the set points representing current values or positions within the represented ranges,
prioritizing the set points into higher priority set points and lower priority set points;
receiving input from the user that adjusts one of the graphical input mechanisms within the respective range;
selecting one of the items from the set based on the graphical indicator adjusted by the user by selecting the item that minimizes a change to the positions of the higher priority set points; and
automatically adjusting at least one of the positions for the set points associated with the graphical input mechanisms.

2. The method of claim 1, wherein receiving input comprises receiving a new position for a set point associated with the graphical indicator adjusted by the user, and selecting one of the items comprises determining which one of the items has an option that most closely matches the set point for the graphical indicator adjusted by the user.

3. The method of claim 1, wherein selecting one of the items comprises selecting one of the items that has options most similar to the set points for a previously selected item.

4. The method of claim 1, wherein one of the options comprises a price associated with each of the items and selecting one of the items comprises selecting one of the items to minimize a change to a price set point for a previously selected item.

5. The method of claim 1, further comprising receiving input from the user that defines priorities for the set points.

6. The method of claim 1, wherein the prioritizing the set points comprises prioritizing the set points that have been recently adjusted by the user.

7. The method of claim 1, further comprising:
receiving input from the user to limit the range associated with one of the options; and
configuring one of the graphical input mechanisms to limit the adjustable positions of the corresponding set point in accordance with the defined range.

8. The method of claim 1, further comprising:
receiving the search criteria from the user; and
querying a database server to retrieve the set of items that match the search criteria; and
determining the ranges of the available options based on the returned set of items.

9. The method of claim 1, further comprising initiating an e-commerce transaction for the selected item in response to receiving action input from the user.

10. The method of claim 9, wherein initiating an e-commerce transaction comprises initiation purchase of the item.

11. The method of claim 1, wherein each of the items comprise one of a service and a product.

12. An electronic commerce system for selecting an item for a user comprising:
a computer-readable storage medium storing a user interface software module for selecting an item from a set of items available from the electronic commerce system; and
a computer executing the user interface software module, wherein the user interface software module presents a user interface that includes a plurality of graphical input mechanisms adjustable by a user,
wherein the graphical input mechanisms represent respective ranges of available options associated with the set of items and further wherein the graphical input mechanisms include set points having adjustable positions within the represented ranges, the set points representing current values or positions within the represented ranges, and
wherein, in response to an adjustment to one of the graphical input mechanisms by the user, the user interface software module selects one of the items based on priorities assigned to the set points to minimize a change to the positions of higher priority set points, and
wherein the user interface software module automatically adjusts at least one of the other graphical input mechanisms based on the selected one of the items.

13. The system of claim 12, wherein the user interface software module re-computes the positions for the set points associated with the other graphical input mechanisms based on the selected item.

14. The system of claim 12, wherein the user interface software module selects one of the items by determining which one of the items has an option that most closely matches a new position for the set point of the graphical indicator adjusted by the user.

15. The system of claim 12, wherein the user interface software module selects one of the items that has options most similar to the set points for a previously selected item when a plurality of the items match the new position for the set point of the graphical indicator adjusted by the user.

16. The system of claim 12, wherein the user interface software module selects one of the items to minimize a change to a price set point for a previously selected item.

17. The system of claim 12, wherein the priorities are user-defined priorities.

18. The system of claim 12, wherein the priorities are based on the set points that have been recently adjusted by the user.

19. The system of claim 12, wherein the user interface software module comprises a client-side user interface software module executing on a client device, and the user interface software module automatically adjusts at least one of the graphical indicators input mechanisms without communicating with a web server.

20. The system of claim 12, wherein each of the items comprise one of a service and a product.

21. A system for reserving airline flights comprising:
a host computer that executes software to transact reservations for airline flights, wherein the airline flights have a set of available options;
a computer-readable storage medium storing user interface software; and
a client computer coupled to the host computer via a network to execute the user interface software,
wherein the user interface software presents a user interface having a plurality of graphical indicators and user-adjustable set points that graphically define positions within ranges of the available options associated with the airline flights,
wherein the set points are prioritized into higher priority set points and lower priority set points,
wherein, in response to an adjustment to one of the set points, the user interface software selects one of the airline flights to minimize a change to the positions of the higher priority set points, and
wherein the user interface software automatically re-computes the positions for the set points of the other graphical indicators of the user interface based on the selected one of the airline flights.

22. The system of claim 21, wherein the options for the airline flights include a price, a number of transfers, a total flying time, a time of departure, and an arrival time.

23. A system comprising:
computing means for providing real-time tradeoff analysis of options associated with items offered to a user by an electronic commerce system;
network interface means for generating a user interface for the computing means;
display means for presenting the user interface to a user;
generation means for generating the user interface to include a plurality of graphical input mechanisms adjustable by the user, each of the graphical input mechanisms representing a respective range of available options associated with the items and having a set point specifying a value within the range,
wherein the set point of each graphical input mechanism presents a current value or position within the represented range, and wherein the set points are prioritized into higher priority set points and lower priority set points,
selection means for selecting one of the items in response to input from a user to minimize a change to the positions of the higher priority set points; and
automatic update means to automatically re-compute one or more of the set points and adjust the graphical input mechanisms associated with the re-computed set points in response to input from the user.

24. The system of claim 23, wherein the input from the user manually adjusts one of the set points, and the selection means selects the item having options that most closely satisfy the manually adjusted set point.

25. The system of claim 23, wherein each of the items comprise one of a service and a product.

* * * * *